(12) United States Patent
Gunda et al.

(10) Patent No.: US 11,934,274 B2
(45) Date of Patent: Mar. 19, 2024

(54) EFFICIENT MECHANISM TO PERFORM AUTO RETENTION LOCKING OF FILES INGESTED VIA DISTRIBUTED SEGMENT PROCESSING IN DEDUPLICATION BACKUP SERVERS

(71) Applicant: Dell Products L.P., Round Rock, TX (US)

(72) Inventors: Kalyan C Gunda, Bangalore (IN); Jagannathdas Rath, Bengaluru (IN); Donna Barry Lewis, Holly Springs, NC (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/078,837

(22) Filed: Dec. 9, 2022

(65) Prior Publication Data
US 2023/0104891 A1    Apr. 6, 2023

Related U.S. Application Data

(63) Continuation of application No. 17/489,600, filed on Sep. 29, 2021, now Pat. No. 11,550,666.

(51) Int. Cl.
*G06F 12/00* (2006.01)
*G06F 9/48* (2006.01)
*G06F 11/14* (2006.01)
*G06F 16/174* (2019.01)

(52) U.S. Cl.
CPC ........ *G06F 11/1448* (2013.01); *G06F 9/4837* (2013.01); *G06F 11/1461* (2013.01); *G06F 16/1748* (2019.01)

(58) Field of Classification Search
CPC ............. G06F 11/1448; G06F 11/1461; G06F 16/1748; G06F 9/4837
See application file for complete search history.

(56) References Cited

U.S. PATENT DOCUMENTS

2014/0173268 A1\* 6/2014 Hashimoto ............ G11C 29/52 713/2

\* cited by examiner

*Primary Examiner* — Shawn X Gu
(74) *Attorney, Agent, or Firm* — Staniford Tomita LLP

(57) ABSTRACT

A first flag is set on a backup file to which data to be backed up is written. The first flag indicates that the backup file should be automatically retention locked after a cooling off period is over. Before the cooling off period is over, a request is received to open the backup file for writes. The request is allowed and upon allowing the request, the first flag is cleared and a second flag is set on the backup file indicating that writes are in progress. The clearing of the first flag excludes the backup file from being automatically retention locked after the cooling off period is over.

18 Claims, 9 Drawing Sheets

EFFICIENT MECHANISM TO PERFORM AUTO RETENTION LOCKING OF FILES INGESTED VIA DISTRIBUTED SEGMENT PROCESSING IN DEDUPLICATION BACKUP SERVERS

CROSS-REFERENCE TO RELATED APPLICATIONS

This application is a continuation of U.S. patent application Ser. No. 17/489,600, filed Sep. 29, 2021, and is incorporated by reference for all purposes along with all other references cited in this application.

TECHNICAL FIELD

The present invention relates generally to information processing systems, and more particularly to automatically retention locking files.

BACKGROUND

A retention lock on a file prevents, for a duration of the lock, the file from being deleted or modified—whether maliciously or accidentally. Options for automatic retention locking can sometimes be found in data protection or backup systems. For example, a data protection system may be configured such that upon completion of a backup all files in the backup are automatically retention locked. With automatic retention locking, an administrator does not have to manually retention lock each individual file included in a backup.

Automatic retention locking is typically designed to be triggered after a preconfigured delay expires following a write to the file. The delay is measured from the modified timestamp (mtime) of the file. The mtime indicates the last time the contents of a file were modified. For example, as new writes are made to a backup file during a backup using distributed file system protocols such as Network File System (NFS) and Common Internet File System (CIFS), the modified timestamp is updated.

Some data protection systems provide for deduplicated storage. A deduplicated storage system can reduce the amount of redundant data that is stored. For example, if a determination is made that a piece of file data has already been stored, the file data is not again stored. Instead, a reference is generated that points to the already stored file data. The deduplication process during a backup can require a lengthy amount of time—especially in cases involving large files to backup. The deduplication processing may be such that the modified timestamp is not regularly or frequently updated throughout the backup operation. In some cases, the deduplication processing time exceeds the delay at which the automatic retention lock is triggered. When this occurs, the backup file becomes locked even though the backup has not yet completed. This leads to a number of the problems one of which is the inability to clean up the broken backup file as retention locked files cannot be deleted until their retention duration expires.

There is a need for improved systems and techniques for handling automatic retention locking in deduplicated backup storage systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
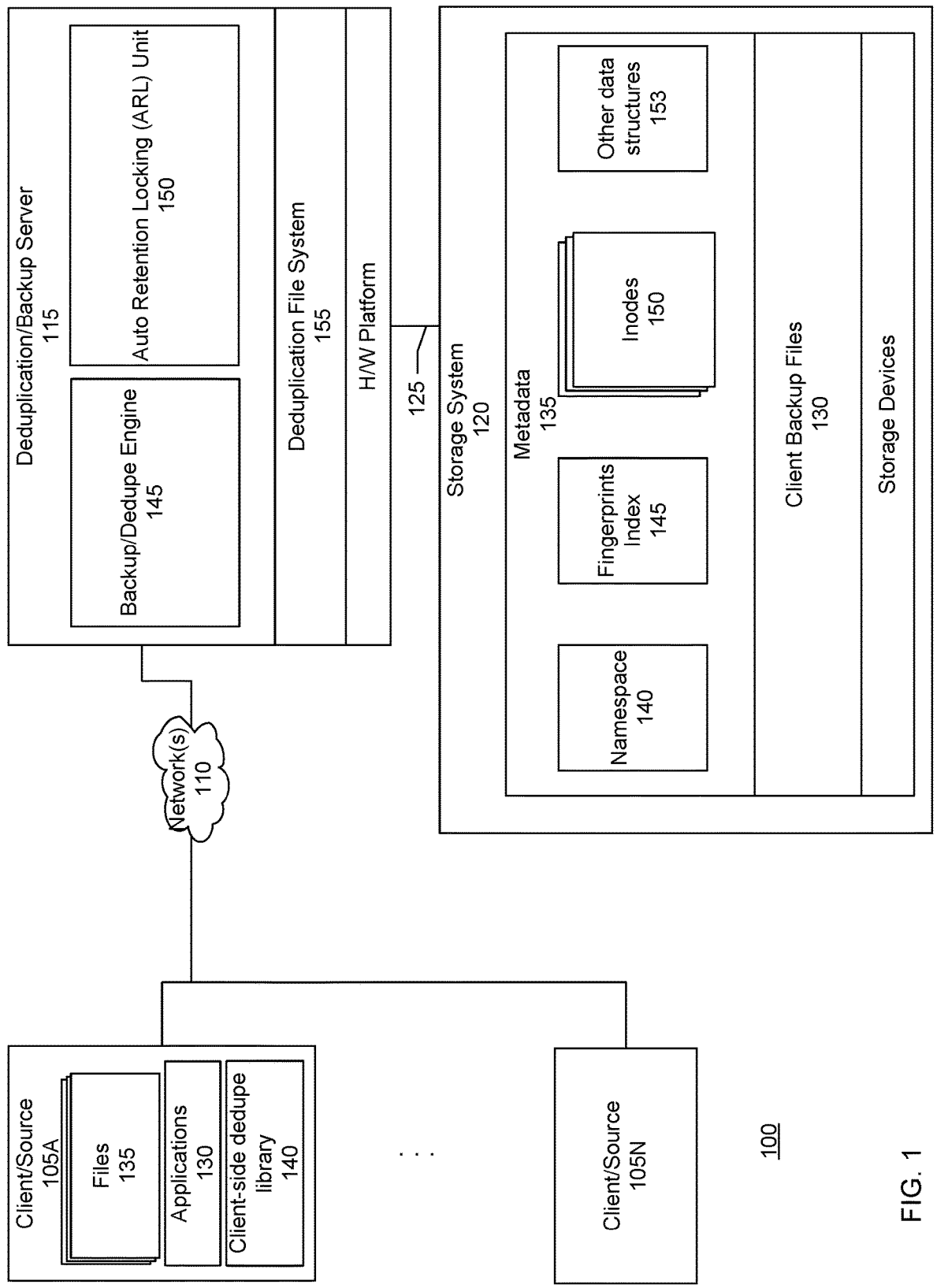
FIG. 1 shows a block diagram of an information processing system comprising an efficient mechanism to auto retention lock files during ingest via distributed segment processing, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two.

FIG. 1 shows a simplified block diagram of an information processing system 100 within which methods and systems for auto-retention locking files ingested via distributed segment processing (DSP) in deduplication backup servers may be implemented. The example shown in FIG. 1 includes a set of clients 105A-N connected via a network 110 to a data protection deduplication backup server 115 which, in turn, is connected to a backup storage system 120 via an interconnect 125. The interconnect may include a bus, a connection over a network such as a storage area network (SAN), or any other connection scheme to communicatively connect to the storage system.

The backup storage system stores backups of client files 130 along with metadata 135 to facilitate organization, deduplication, security, recovery, performance, and access. Metadata may include a file system namespace 140, fingerprint index 145, inodes 150, and other data structures 153. The backups are secondary copies that can be used in the event that primary file copies on the clients become unavailable due to, for example, data corruption, accidental deletion, natural disaster, data breaches, hacks, or other data loss event. The backups may be stored in a format such as a compressed format, deduplicated format, or encrypted format that is different from the native source format.

The storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, or an object or cloud storage service. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage system may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, the storage system may represent logical storage that includes any number of physical storage devices connected to form a logical storage.

The clients may include servers, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

A client may include applications 130 and files 135 that are to be backed up to the backup storage system. The applications may include a backup application. In an embodiment, a client includes a client-side deduplication library 140. The backup server includes a backup/deduplication engine 145, auto-retention locking (ARL) unit 150, and deduplication file system 155. The backup/deduplication engine, in conjunction with the client-side deduplication library, are responsible for processing and backing up client files to the backup storage system. The processing and backup operations may be referred to as file ingest. The ARL unit is responsible for automatically retention locking the backed up files to prevent malicious (or accidental) modification or deletion of the backed up files for a period of time that may be referred to as a retention duration. The deduplication file system is responsible for organizing and providing (or blocking) access to the backed up files. It should be appreciated that the blocks shown in FIG. 1 and other figures may be functional and there can be many different hardware and software configurations to implement the functions described.

In brief, a client application, such as a backup application, interfaces with the client-side deduplication library to perform backups of the files. The client-side deduplication library, in turn, communicates with the backup/deduplication engine of the backup server to backup the files, in a deduplicated manner, to the backup storage system. Data regions, portions, or segments of a file that are unique or changed from previous backups are written or stored to the backup storage system. However, regions of a file that have already been stored to the backup storage system, e.g., are duplicates or not changed from previous backups, are not again stored. Instead, metadata references are generated to point to the already stored regions. Backups may include an entire file system of a client, portions or subsets of files in the client file system, a database, or any other unit of data.

In an embodiment, the client-side deduplication library in conjunction with the deduplication backup server provides for a deduplicated backup protocol that may be referred to as distributed segment processing (DSP) or client-side deduplication. Thus, the clients may be referred to as DSP clients. A specific example of the deduplicated backup protocol is Data Domain Boost (DDBoost) as provided by Dell EMC of Hopkinton, Massachusetts and Round Rock, Texas. While some embodiments are described in conjunction with the DDBoost protocol it should be appreciated that aspects and principles described herein can be applied to other similar protocols that may be referred to by other names. Conducting backups using DSP allows for reducing network bandwidth and compute resources as compared to other traditional protocols for transmitting and accessing files over a network such as Network File System (NFS) and Common Internet File System (CIFS).

In an embodiment, during a backup an application on a client calls the client-side deduplication library application programming interfaces (APIs) which, in turn, issue remote procedure (RPC) calls to the dedupe server. Client-side library code cooperates with server-side code to perform distributed deduplication of user data to reduce the data that is actually sent to the server and to reduce the physical storage required to store the data.

More particularly, in deduplication (or dedupe) systems, a file may be split into unique and variable sized chunks of data, also known as segments. These segments are deduped across multiple files in the system. The uniqueness of each segment is generally identified by segment references (seg refs) or fingerprints (hashes). In some cases, ingesting new data includes backup applications and clients sending the entirety of data to the dedupe system/server (via NFS or CIFS or similar protocols). The dedupe server then processes the data by segmenting and fingerprinting them, identifying the unique and non-unique segments and finally writing only the new/unique segments to the disks while the non-unique segments are simply deduped to the existing segments.

Figure 2:
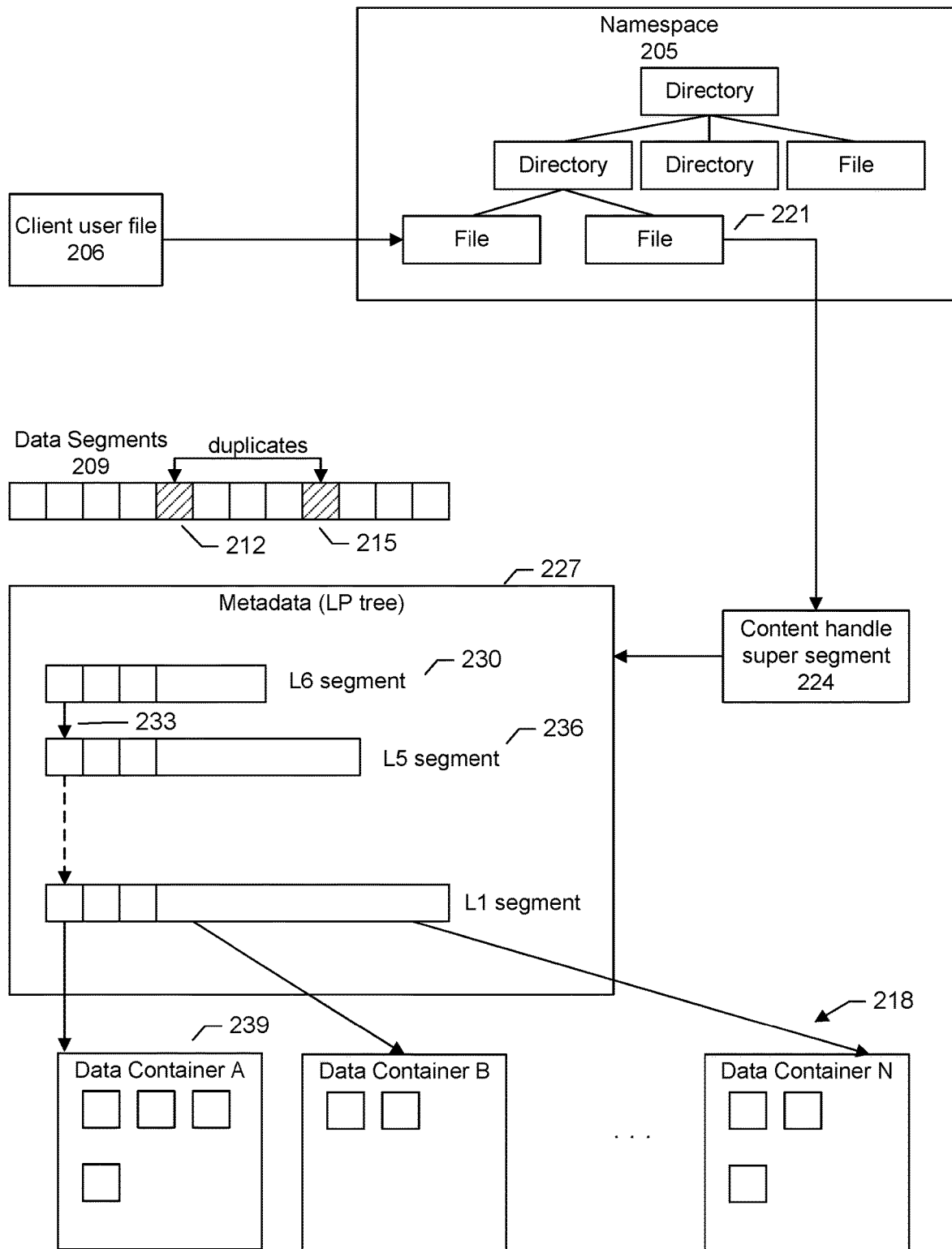
FIG. 2 shows an example of a deduplication process, according to one or more embodiments.

FIG. 2 shows a block diagram illustrating a deduplication process of the deduplication file system according to one or more embodiments. As shown in the example of FIG. 2, the file system maintains a namespace 205. As data, such as incoming client user file 206, enters or is ingested by the file system, it is segmented into data segments 209 and filtered against existing segments to remove duplicates (e.g., duplicate segments 212, 215). A segment that happens to be the same as another segment that is already stored in the file system may not be again stored. This helps to eliminate redundant data and conserve storage space. Metadata, however, is generated and stored that allows the file system to reconstruct or reassemble the file using the already or previously stored segment. Metadata is different from user data. Metadata may be used to track in the file system the location of the user data within the storage system.

More specifically, the file system maintains among other metadata structures a fingerprint index. The fingerprint index includes a listing of fingerprints corresponding to data segments already stored to the storage system. A cryptographic hash function (e.g., Secure Hash Algorithm 1 (SHA1)) may be applied to segments of the incoming file to calculate the fingerprints (e.g., SHA1 hash values) for each of the data segments making up the incoming file. The fingerprints are compared to the fingerprint index. Matching fingerprints indicate that corresponding data segments are already stored. Non-matching fingerprints indicate that the corresponding data segments are unique and should be stored.

Unique data segments may be stored in fixed size immutable containers 218. There can be many millions of containers tracked by the file system. The fingerprint index is updated with the fingerprints corresponding to the newly stored data segments. A content handle 221 of the file is kept in the file system's namespace to support the directory hierarchy. The content handle points to a super segment 224 which holds a reference to a top of a segment tree 227 of the file. The super segment points to a top reference 230 that points 233 to metadata 236 and data segments 239.

In other words, in a specific embodiment, each file in the file system may be represented by a segment tree. The segment tree includes a set of segment levels arranged into a hierarchy (e.g., parent-child). Each upper level of the segment tree includes one or more pointers or references to a lower level of the segment tree. A last upper level of the segment tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A segment tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes.

In an embodiment, every segment in the file system is identified by a 24 byte key (or the fingerprint of the segment), including the LP segments. Each LP segment contains references to lower level LP segments. An example of a tree data structure includes a binary tree.

Figure 3:
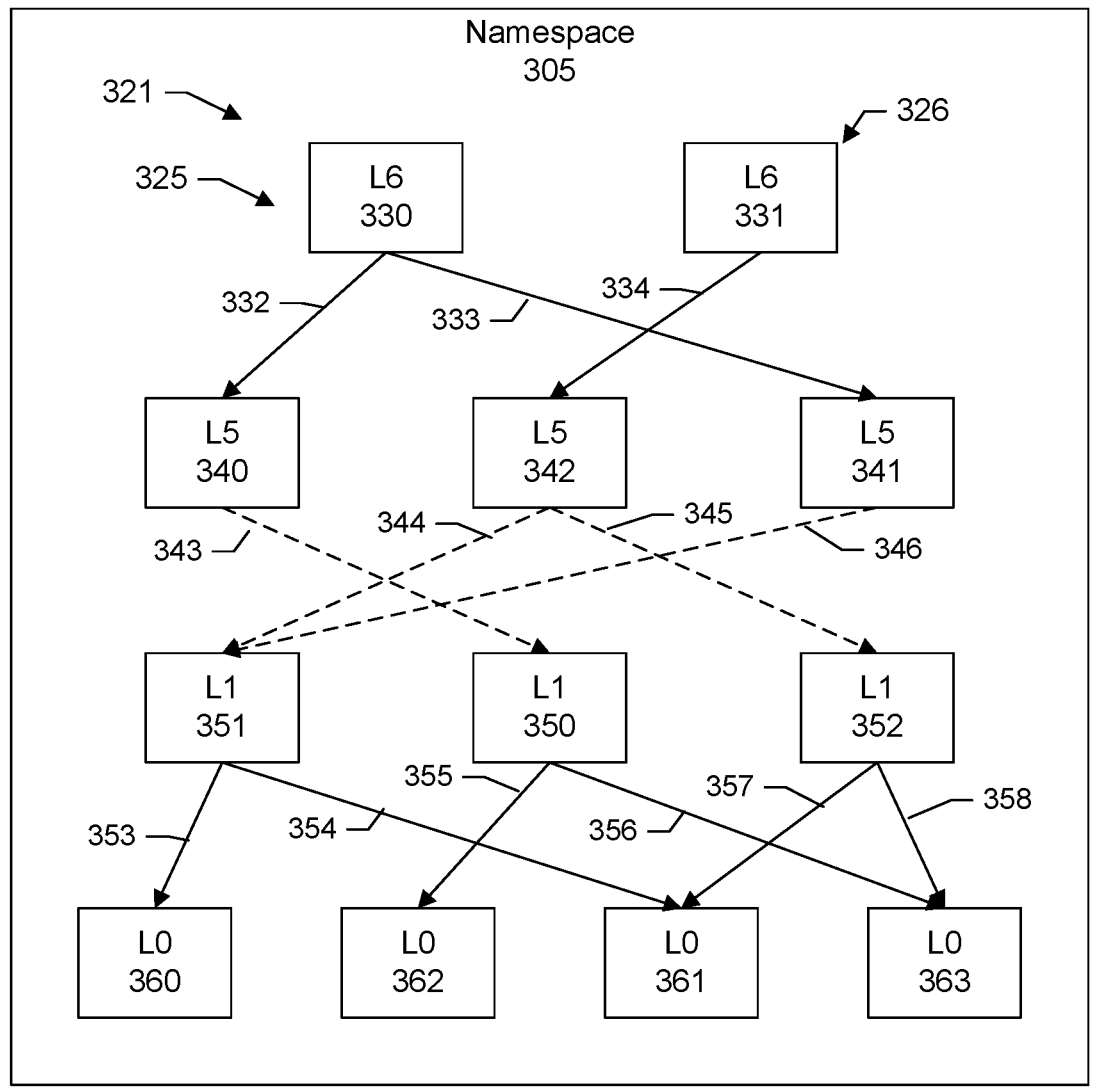
FIG. 3 shows an example of a namespace, according to one or more embodiments.

FIG. 3 shows further detail of a namespace 305 of the file system that may be used to organize the client data stored in the storage system. The namespace includes a set of segment trees 321 where each file in the file system is represented by a segment tree. A segment tree includes a set of segment levels arranged in a hierarchy. In a specific embodiment, a segment tree can have up to seven levels that may be labeled L6 to L0. For example, one or more intermediate levels may not be present for a relatively small file. A relatively small file may have, in addition to an L0 segment, just an L6 and L1 segment. A relatively large file may have, in addition to an L0 segment, an L6, L5, L4, L3, L2, and L1 segment.

Segments from L6 to L1 are upper level segments that store metadata (e.g., fingerprints) and may be referred to as LP segments. The lowest level segments are the L0 segments which represent actual data content of the file. An upper level segment references one or more lower level segments.

Thus, an L6 segment includes an array of L5 references. An L5 segment includes an array of L4 references. An L4 segment includes an array of L3 references. An L3 segment includes an array of L2 references. An L2 segment includes an array of L1 references. An L1 segment includes an array of L0 references. In other words, lower level segments are referenced by higher level segments.

The example shown in FIG. 3 shows segment levels L6, L5, L1, and L0. Segment levels L4, L3, and L2 have been omitted for purposes of clarity. An L6 segment forms a root or parent. Thus, in the example shown in FIG. 3, there is a first segment tree 325 having an L6 segment 330 and representing a first file. There is a second segment tree 326 having an L6 segment 331 and representing a second file.

Two or more files may share a same segment. A lower level segment may be referenced by one or more upper level segments. For example, a lower level segment may be referenced by a first upper level segment, and a second upper level segment. The first upper level segment may be from a first segment tree representing a first file. The second upper level segment may be from a second segment tree representing a second file. An upper level segment may reference one or more lower level segments. For example, an upper level segment may reference a first lower level segment and a second lower level segment.

In the example shown in FIG. 3, L6 segment 330 references L5 segments 340, 341 as shown by arrows 332, 333 from L6 330 to L5 340, 341, respectively. L6 segment 331 references L5 segment 342 as shown by an arrow 334 from L6 331 to L5 342. L5 segment 340 references an L1 segment 350 as shown by an arrow 343 from L5 340 to L1 350. L5 segment 342 references L1 segments 351, 352 as shown by arrows 344, 345 from L5 342 to L1 351, 352, respectively. L5 segment 341 references L1 segment 351 as shown by an arrow 346 from L5 341 to L1 351. The arrows from the L5 to L1 segment level are shown in broken lines to indicate that there can be other intermediate levels between the L5 and L1 levels.

L1 segment 351 references L0 segments 360, 361 as shown by arrows 353, 354 from L1 351 to L0 360, 361, respectively. L1 segment 350 references L0 segments 362, 363 as shown by arrows 355, 356 from L1 350 to L0 362, 363, respectively. L1 segment 352 references L0 segments 361, 363 as shown by arrow 357, 358 from L1 352 to L0 361, 363, respectively.

In a specific embodiment, an upper level segment includes a fingerprint of fingerprints of one or more lower level segments referenced by the upper level segment. For example, L6 segment 330 includes a finger of fingerprints of L5 segments 340, 341. L6 segment 332 includes a fingerprint of fingerprint of L5 segment 342. L5 segment 340 includes a fingerprint of fingerprint of L1 segment 350. L5 segment 342 includes a fingerprint of fingerprints of L1 segments 351, 352, and so forth.

Referring back now to FIG. 1, as discussed, reducing the amount of data being sent by clients to the dedupe system can be accomplished using Distributed Segment Processing (DSP) in the form of client libraries (e.g., DDBoost library), which runs on the backup clients or other client systems from where data is ingested into the dedupe system via the client library.

In DSP, after the client receives the new ingest data from the backup applications, it segments the data, generates fingerprints for each segment and then transmits the fingerprints to the dedupe server for processing. The dedupe server compares the fingerprints against a fingerprint filter, to identify the unique fingerprints that are not present in the fingerprint database, corresponding to data segments that have not been previously backed up by the server. The server then communicates back to the client which of the sent fingerprints are unique or new. The client backups the data by sending only the segments corresponding to the unique fingerprints. Once these segments are added to the backups maintained by the server, the new fingerprints are added to the fingerprint database. So, DSP helps in reducing the network I/O to a great extent as compared to data ingest via NFS/CIFS or other protocols. At the end, once all unique segments are sent to the dedupe server and written ondisk, the file metadata is constructed there. The segment tree or metadata mappings (such as offset length and the like) received from the client are used to build the file metadata or the segment tree in the dedupe server. And only after this is done, are the file attributes such as file size and modification time (mtime) updated for the ingested file.

Auto Retention Lock (ARL) is a mechanism that may be provided by backup servers to automatically retention lock the files for a pre-configured duration, after the ingest completes. The benefit for the backup applications is that with ARL they need not manually lock each backup file after the ingest. In an embodiment, the ARL mechanism includes a cooling off period (COP) which is the amount of idle time after the last write was done before the file is automatically retention locked. That is, the file is automatically retention locked if there are no further writes during this period. The COP generally starts right when the file is created and as writes continue to occur, the COP is reset and starts afresh until the last write. The ARL mechanism further includes a pre-defined lock duration, i.e., the amount of time for which the files should be auto locked, e.g., (retention duration).

In other words, the COP provides for a delay in automatically retention locking a file. The delay may start when a file, e.g., backup file, is created. As writes continue to be made to the file, the COP continues to reset. Once the COP has elapsed, there being no further writes to the file for the duration of the COP, the file is automatically retention locked.

In deduplication servers, for ingest done directly via NFS/CIFS protocols, the file size and mtime (file modification time) attributes are regularly and continuously updated. More particularly, in the case of backups using NFS/CIFS protocols, an entirety of data, e.g., whole file, is sent from the source client to the destination deduplication server regardless of whether or not portions of the file already exist at backup storage. The unique segments are detected by dedupe server and written ondisk; while segments determined to be duplicates or redundant are not. Therefore, with the NFS/CIFS protocols, the amount of data to be written and the progress at any point in time is known in the dedupe server. As the mtime is regularly updated, the COP continues shifting (resetting). And once all writes are done and when there are no more writes happening for the duration of COP, the file gets auto locked.

But, with DSP, this regular update of mtime is not possible and does not occur. The reason is because only unique segments are sent by the client and written by the dedupe server. And therefore, in the dedupe server, at any point of time it is not possible to detect how much of the data has been ingested so far and how much is remaining. This results in the inability of the dedupe server to update the mtime or the size until all the segments are processed by the client and the file metadata is eventually constructed at the end. That is, the resetting of the COP during ingest relies on the mtime or file modification time attribute to help ensure that a file is not prematurely retention locked.

The lack of regular updates to mtime under DSP leads to several problems. In particular, the COP that was set when the file was first created, never gets a chance to reset again as the file attributes (mtime specifically) are never modified until the end and eventually the COP time duration completes and the file is auto locked—even though ingest might be still going on. The problem is most prominent for large backups which require more ingest time than the defined COP. This issue results in broken backup files which are retention locked and cannot be cleaned up until their retention duration expires sometime in the future.

Such broken backups lead to unnecessary overhead for the backup application and the administrators to keep track of them, their expiry, and cleanup once they expire. In retention lock compliance modes, there is no way to cleanup such broken backup images until they expire sometime in the future. For other lenient retention lock modes such as governance, the dedupe server may provide ways to revert the lock before expiry. Such an option, however, would require manual intervention of the administrators to revert the lock and cleanup such images. Further, these broken backup files occupy unnecessary space in the dedupe server until this administrative cleanup occurs.

In other words, backups conducted using DSP (or client-side dedupe) allows for a reduction in the amount of redundant data that sent over the network from the client to the deduplication server by relying on the client for a portion of the processing. When, however, particularly large files are involved there may be delays with the deduplication server receiving all the unique data segments from the client as the client may be in the midst of locating the unique data segments, occupied with other related processing tasks, or there can be network delays and congestion. As a result, writes to the backup files at the deduplication server may be delayed while the client continues to process the data for backup. The lack of writes to the backup files results in a lack of updates to the mtime (or file modification time) of the backup files. The timer for the COP continues to run and once the COP has elapsed the backup files are automatically retention locked—before the backup has completed—thus resulting in broken backup files that are difficult to delete.

The traditional approach followed by dedupe servers to solve this problem is to increase the cooling off period to high values, e.g., increase the length of the COP, so that the ingest of data gets enough data to complete before the COP exhausts. For example, the COP may be set to 2 days or 3 days. But, this might expose a large window of time where the file is not locked and can be modified or deleted by malicious users. For example, consider that the ingest completes in half of the time of COP. The files will remain unlocked for a lengthy period of time. It would be desirable for the files to be auto locked as soon as they are ingested, e.g., within a short or the minimal possible time such as 15-30 mins.

In an embodiment, the deduplication client (DSP client) uses an unstable protocol for the data transfer to the dedupe server. In the unstable protocol, data is not committed until writes are completed at which time the data is then flushed to disk and the mtime/size finally updated. The unstable protocol offers a performance advantage over the stable protocol in which data is frequently committed. The problem with the COP elapsing before ingest is complete can be addressed using a stable protocol. Doing so, however, would defeat the purpose of client dedupe as it would impact the performance heavily, as in the stable mode the data and its metadata would get committed frequently. Though this will result in mtime/size updates, there will be a large performance penalty. Thus, this approach is generally not feasible or practical for DSP (client dedupe) scenarios. Alternatively, having the dedupe server setting the ARL flags and its attributes during the file close instead of the file create, may cause discrepancies in the principle of ARL. This would be undesirable for applications which create the file and then have a considerable delay before starting the write. The delay may be due to, for example, the application shifting resources to other tasks or backups. In such cases, the file is vulnerable to malicious deletions, as there is no cooling period associated now (and not until the write completes and close occurs). It is desirable to have a new protocol that allows for both the performance benefits of DSP (or client-side deduplication) and the security benefits of automatic retention locking to be realized.

Described herein is an efficient method to enhance the distributed segment processing (DSP) process to perform the auto retention locking in a very efficient and robust manner including:

1) Setting ARL and COP for a file right when its created, but once the application starts writing, resetting the COP and not triggering COP until the application indicates that it is done writing the file completely, e.g., after the complete ingest.
2) Ensuring that if the application re-opens the file, while the file is in COP, then clearing/resetting the ongoing COP until the application again indicates that it is done writing/modifying the file completely.
3) When no further writes are issued from application and the COP duration has elapsed, ensuring that the file is auto locked.
4) Allowing applications to re-open ingested data for overwriting or modification, only if it is done within the COP.
5) Allowing for cleanup by the dedupe server, backup applications, or administrators in cases of an ingest failing due to issues such as application crashes, dedupe server crashes, network issues, and the like. In other words, not locking the file or not triggering the cooling off period to allow for incomplete ingest files to be deleted, thereby preventing locked broken backup files.

In an embodiment, when a DSP client starts data ingest and issues a file create request to the dedupe server, the new file is marked to identify it as a file created under ARL. The marking may be accomplished by storing an ARL flag in the inode metadata (e.g., inode mode) value or other related data structures. The configured cooling off period (COP) and retention expiry time are also set for the new file inode. The cooling period starts the moment file is created.

In other words, the file is marked as an ARL file when it is created, followed by setting the COP and the expiry time. If the write does not come until a long time (greater than COP), then the file will become auto locked.

Once the COP is triggered with the creation of the file, the applications will then have to first open the file in read-write mode and once the file is open, perform the writes and eventually close the file, to complete the data ingest—all via the DSP client.

In an embodiment, when the application issues the first or initial DSP open request after the file was created, the dedupe server will first check if the COP has already completed and thus whether the file is locked or not.

If the file is locked, then open will fail. This scenario is possible in two cases. The first case is when the backup application creates the file but delays in starting the write, such that a length of the delay is greater than a length of the COP. The second case is when the backup application attempts to overwrite or modify an already locked file. It is desirable for the open request to fail here as per retention lock semantics in order to not allow any kind of modification or deletion for locked files.

But, if with the open request it is found that the COP has not elapsed then the file is not yet locked. In this case, the ARL identifying metadata is temporarily removed for that file. In other words, if the dedupe server has set an ARL flag in the inode, then the flag is temporarily removed and then the file open command completed so that writes can start.

This scenario is the usual case. That is, the backup application opens the files for writes immediately after creating the file or within a short delay (less than COP). This can also happen when the file is fully written and is currently under COP and the backup application again wants to modify it. So, the backup application opens the file in read-write mode to issue re-writes. As the file is not locked, the writes will be allowed after clearing the ARL metadata temporarily.

In an embodiment, once the ARL metadata is removed, a new flag that may be referred to as an ARL-Ingest-In-Progress flag is set in the metadata of the inode. The ARL-Ingest-In-Progress flag is used to identify or indicate that the ARL property of the file has been temporarily removed for open. The ARL-Ingest-In-Progress flag is removed at the end of the ingest (when ARL metadata will set back again). The ARL-Ingest-In-Progress flag helps to facilitate the cleanup of broken backup files as might occur during application or dedupe server crashes. In particular, the ARL-Ingest-In-Progress flag can be utilized to identify the files for which ingest never completed or in other words broken backup files. The ARL-Ingest-In-Progress flag can also be used to report the files which are still in ingest, but are going to be auto locked after ingest. Once the writes are completed, the application will close the file. In the close phase of DSP, the ARL identifying metadata (e.g., flag) that was removed with the open request, is set back. Once the ARL flag is set back in the inode, the COP starts immediately. The ARL-Ingest-in-progress flag that was set with the open request is now removed.

When an ingest is in progress, the application crashes, and no close occurs, such a file will not become locked as the ingest is not deemed to be complete. Thus, broken backup files can now be easily cleaned up by applications or administrators. There will no longer be locked broken backups in the dedupe server. Dedupe servers having an abandoned files cleanup process can cleanup such files without any restriction.

In other words, in the open phase of DSP if it is found that the "ARL metadata flag" is not set, but "ARL-ingest-in-progress" flag is found to be set, then a determination can be made that it is a case of an incomplete/broken ingest for a file created under ARL. That is, either the application crashed, dedupe server crash, or there was some other event that interrupted the data ingest process during a backup. In such a case, open requests are also allowed so that writes can occur. And when the close occurs, the ARL flag is set back and "ARL-ingest-in-progress" flag removed. It is at that point that COP will start.

Figure 4:
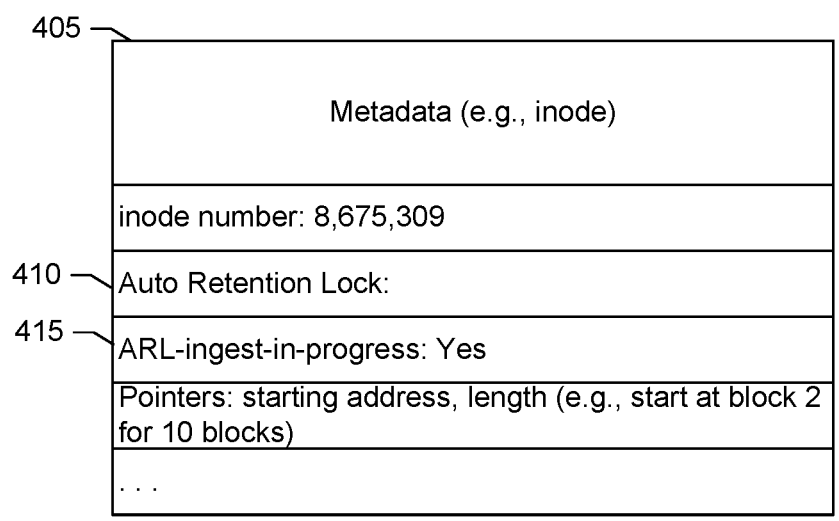
FIG. 4 shows an example of an inode, according to one or more embodiments.

FIG. 4 shows an example of an inode data structure 405 to facilitate auto retention locking of files ingested via distributed segment processing. An inode is a type of data structure that stores information about a file. When a file is created, such as a backup file to store backups of client data, it is assigned a name and an inode is allocated for the file. The inode is identified by an inode number that is unique within the file system. File names and their corresponding inode numbers are stored as entries in a directory. The inode stores metadata for the file.

As shown in the example of FIG. 4, in an embodiment, the inode for a backup file includes first and second flags 410 and 415, respectively. The first flag may be referred to as the auto retention lock (ARL) flag. The ARL flag, when set, indicates that the corresponding file should be retention locked upon the expiration of the cooling off period.

The second flag may be referred to as the ARL-ingest-in-progress flag. The ARL-ingest-in-progress flag, when set, indicates that the corresponding file is in the process of being written to (e.g., backup data is being ingested and unique data segments are being written to the file) and should not be retention locked.

Other attributes of an inode may include an inode number, file owner, file type (e.g., regular file or directory), file size, file modification time (e.g., mtime), file creation time, access permissions, address/length pairs pointing to extents where file data content resides, and other attributes.

Every file and directory in a file system has an inode storing metadata. The metadata may be made available to the applications, kernel, or other file or operating system utilities and processes. When, for example, an application refers to a file by name, the operating system uses that name to look up the corresponding inode, which then enables the system to obtain the information it needs about the file to perform further operations. The file system and other processes use the information in an inode to locate a file associated with the inode and determine what operations may be carried out on the file.

Figure 5:
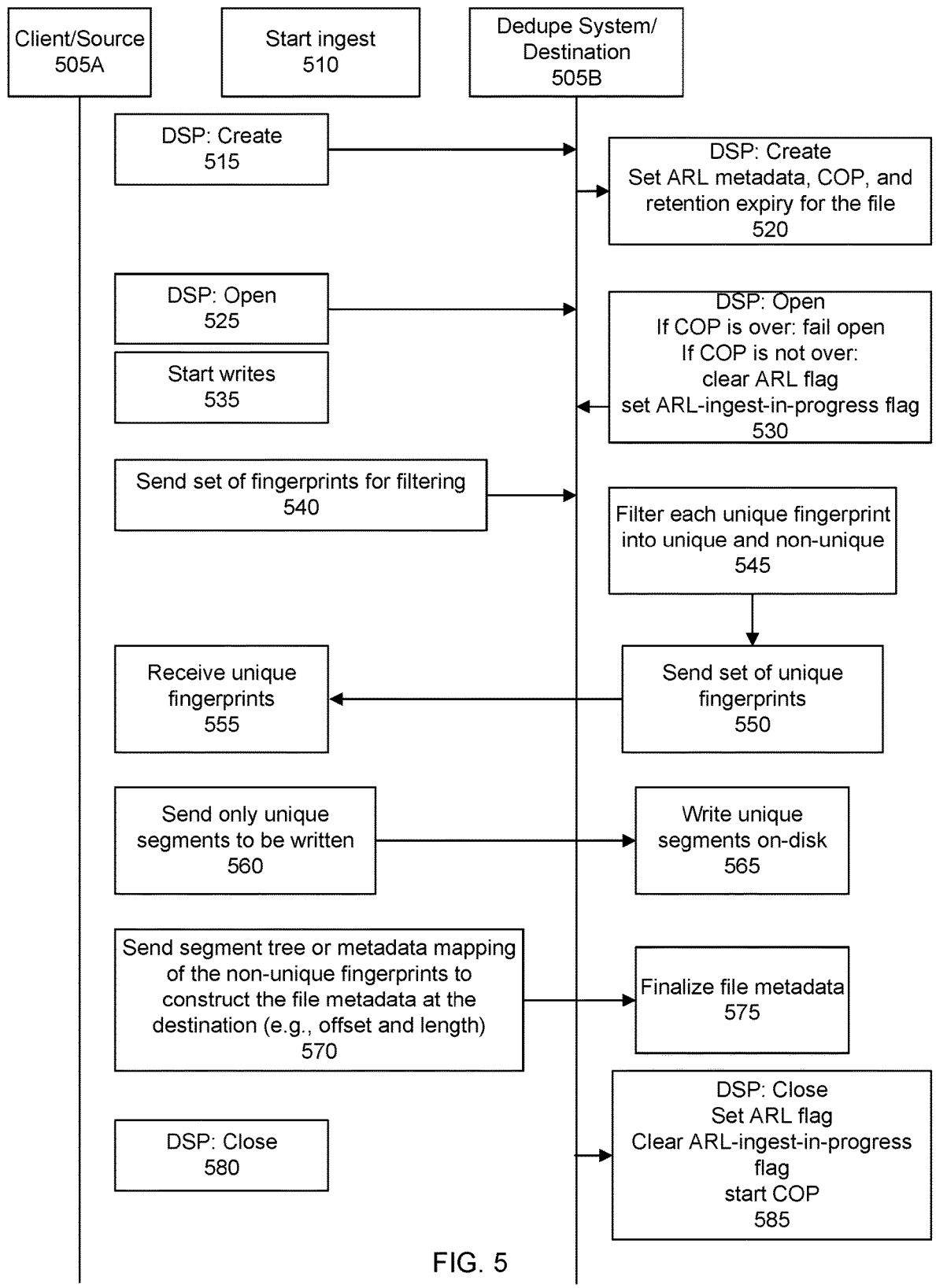
FIG. 5 shows a swimlane diagram for auto retention locking files ingested via distributed segment processing, according to one or more embodiments.

FIG. 5 shows a swimlane diagram detailing the interactions and events during backups using distributed segment processing with auto retention lock enabled. As shown in the example of FIG. 5, there are first and second actors 505A,B. The first actor includes a client or source. The second actor includes the deduplication system or destination. A block 510 indicates a start of ingest for a backup of data from the client/source to the dedupe system/destination. For example, a backup application at the client may issue a request to the client-side deduplication library installed at the client that a backup should be initiated. In a block 515, the client-side deduplication library issues a file create request to the dedupe system/destination.

In a block 520, the dedupe system/destination in response to the file create request creates the file for backup. The creation of the file is accompanied by setting ARL metadata (e.g., ARL flag), triggering a start of the cooling off period, and setting the retention expiry for the file (e.g., retention duration).

In a block 525, the client-side deduplication library issues a file open request to the dedupe system/destination. In a block 530, the dedupe system/destination in response to the file open request checks whether the cooling off period has elapsed. If the COP has elapsed, the open request is failed. If the COP has not elapsed, the ARL flag is cleared and the ARL-ingest-in-progress flag is set. The file open request is also allowed in cases where the ARL-ingest-in-progress flag is set.

Thereafter, in a block 535, writes to the backup file begin. As discussed, in an embodiment, the backup is conducted using distributed segment processing. In particular, in a block 540, a set of fingerprints is transmitted from the client-side deduplication library to the dedupe system for filtering. The fingerprints correspond to data segments of a file at the client that is to be backed up.

In a block 545, the dedupe system filters each fingerprint to identify unique and non-unique fingerprints. Non-unique fingerprints correspond to data segments of the file already existing at the dedupe system. Unique fingerprints correspond to data segments of the file not already existing at the dedupe system.

In a block 550, the set of unique fingerprints are transmitted back to the client. In a block 555, the client-side deduplication library receives the set of unique fingerprints from the dedupe system. In a block 560, the client-side deduplication library locates the data segments of the file corresponding to the unique fingerprints and sends these unique data segments to the dedupe system to be written to the backup file.

In a block 565, the dedupe system writes the unique segments to the backup file on-disk. In a block 570, client-side deduplication library sends the segment tree or metadata mapping of the non-unique fingerprints to the dedupe system in order to construct the file metadata at the dedupe system/destination. The metadata may include, for example, offset and length information for the file. In a block 575, the received file metadata is finalized at the dedupe system.

In a block 580, the client-side deduplication library issues a file close request to the dedupe system. In a block 585, the dedupe system in response to the file close request, sets the ARL flag, clears the ARL-in-progress flag, and triggers a start of the COP.

Figure 6:
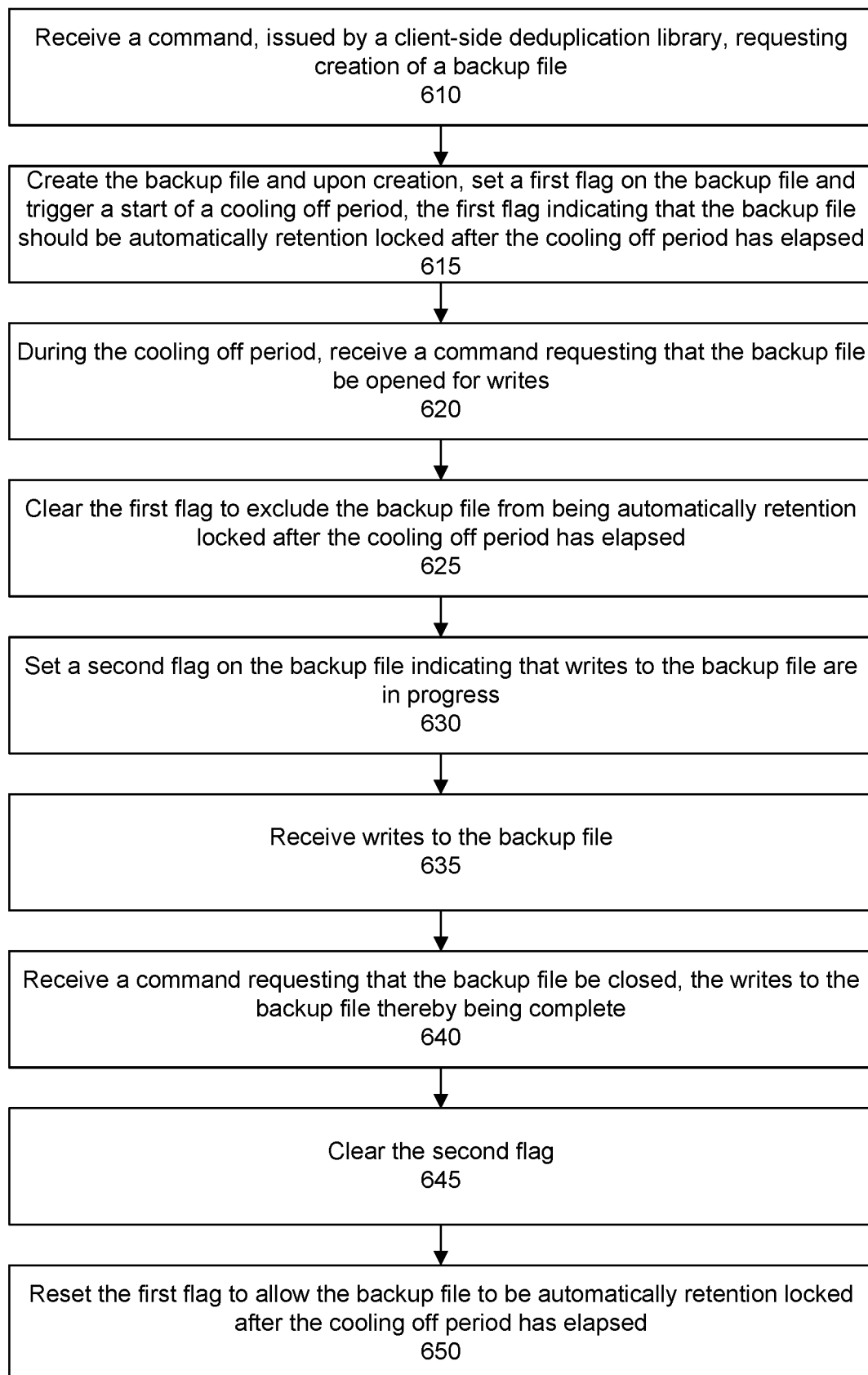
FIG. 6 shows a flow diagram for auto retention locking files ingested via distributed segment processing, according to one or more embodiments.

FIG. 6 shows another flow detailing file backups using distributed segment processing with auto retention lock enabled. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 610, a command requesting creation of a backup file, issued by a client-side deduplication library, is received.

In a step 615, the backup file is created. Upon the creation of the backup file, a first flag is set on the backup file and a start of a cooling off period is triggered. The first flag indicates that the backup file should be automatically retention locked after the cooling off period has elapsed.

In a step 620, during the cooling off period, a command is received requesting that the backup file be opened for writes. In a step 625, responsive to the open command, the first flag is cleared to exclude the backup file from being automatically retention locked after the cooling period has expired. In a step 630, in conjunction with the clearing of the first flag, a second flag is set on the backup file. The second flag indicates that writes to the backup file are in progress. In a step 635, writes to the backup file are received.

Figure 7:
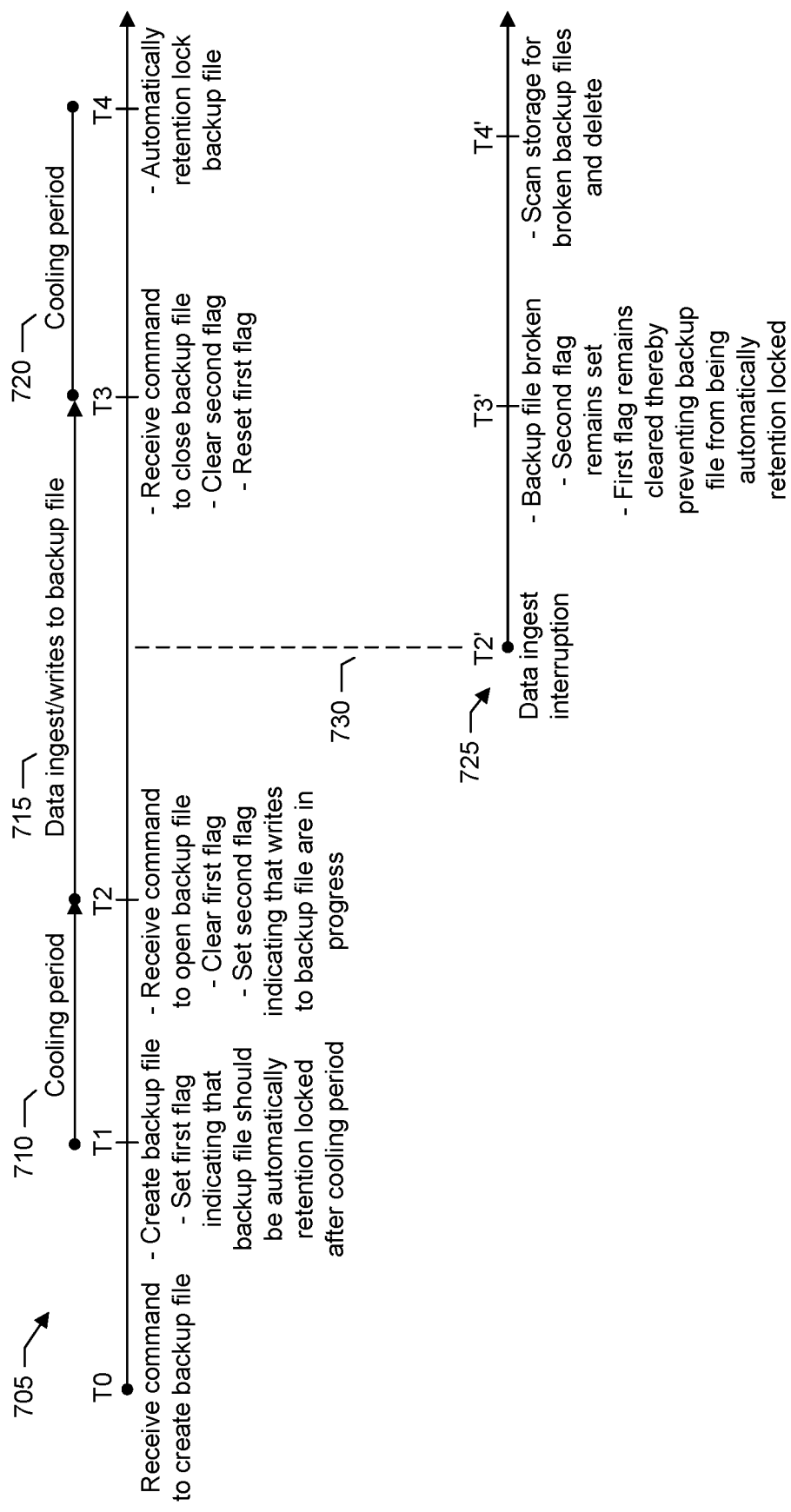
FIG. 7 shows timelines of events for auto retention locking files ingested via distributed segment processing, according to one or more embodiments.

FIG. 7 shows a timeline 705 of events for the flow shown in FIG. 6. A time T0 indicates receipt of the command to create the backup file (step 610). At a time T1, the backup file is created. The creation of the backup file is accompanied by triggering a start of a cooling off period 710 and setting a first flag on the backup file indicating that the file should be automatically retention locked after the cooling period has elapsed (step 615).

At a time T2, within the cooling period, e.g., before the cooling off period has expired, a command is received requesting opening of the backup file for writes (step 620).

As the cooling off period has not yet expired, the first flag is cleared and the second flag is set indicating that writes to the backup file are in progress. The clearing of the first flag stops or cancels the cooling off period and prevents the file from being automatically retention locked. Data ingest and writes to the backup file can then proceed 715 without concern that the file will be automatically retention locked should writes be delayed due to the time required to process a large backup.

Referring back now to FIG. 6, in a step 640, a command is received requesting that the backup file be closed, the writes to the backup file thereby being complete. In a step 645, the second flag is cleared, thereby indicating that writes are no longer in progress. The clearing of the second flag is accompanied by a resetting of the first flag to allow the backup file to be automatically retention locked after the cooling off period has elapsed.

Referring now to FIG. 7, at a time T3 the command to close the backup file is received. Upon receipt of the close command, the second flag is cleared, the first flag is reset, and a cooling off period 720 is thus restarted. The cooling off period restarts at a beginning of the cooling off period. A time T4 indicates an end or expiration of the cooling period at which the backup file is then automatically retention locked.

As discussed, a benefit of the protocol to handle backups under DSP with automatic retention locking is the ability to delete broken backup files. For example, FIG. 7 shows an alternate timeline 725 in which there was an interruption 730 at a time T2' during the data ingest/backup process. For example, the client backup application or dedupe server may have crashed or lost power. As a result, at a time T3' there will be a broken backup file on the storage system in which the second flag remains set, but the first flag (ARL flag) remains cleared thereby preventing the file from being automatically retention locked. The file may be considered abandoned and is able to be deleted because it is not retention locked. At a time T4', the storage system can be scanned for broken backup files and the files can be deleted. For example, once the system is brought back on line, a scan can be performed of files having a second flag set and the files can be deleted.

As discussed, in an embodiment systems and techniques provide a unique and efficient way to support auto retention locking in distributed segment processing workloads, such that the primary problem of the cooling off period expiring while ingest is still in progress, is completely removed. The design does not require a large or lengthy cooling off period or changing to a stable protocol in the DSP client. There is no exposure window possible right from the CREATE, OPEN, CLOSE and LOCK operations. Further, systems and techniques strongly adhere to or confirm with retention locking principles. Backup applications no longer have to adjust their cooling off periods to higher values (i.e., longer durations) to ensure ingest for bigger backups complete before the cooling off period expires. That is, the ingest can take as much time as needed, COP and then locking occurs after the ingest is fully successful. In cases of the dedupe server crashing, application crashing, or network errors or other events that interrupt the backup operation, the broken backups files are not locked and can be easily cleaned up by the application, administrators, or dedupe server.

In an embodiment, there is a method comprising: receiving a command, issued by a client-side deduplication library, requesting creation of a backup file; upon creating the backup file, setting a first flag on the backup file indicating that the backup file should be automatically retention locked after a cooling off period has elapsed; during the cooling off period, receiving a command, issued by the client-side deduplication library, requesting that the backup file be opened for writes; clearing the first flag to exclude the backup file from being automatically retention locked after the cooling off period has elapsed; setting a second flag on the backup file indicating that writes to the backup file are in progress; receiving a command, issued by the client-side deduplication library, requesting that the backup file be closed, the writes to the backup file thereby being complete; clearing the second flag; and resetting the first flag to allow the backup file to be automatically retention locked after the cooling off period has elapsed.

The method may include setting the first flag on a second backup file indicating that the second backup file should be automatically retention locked after the cooling off period has elapsed; during the cooling off period, receiving a command requesting that the second backup file be opened for writes; clearing the first flag set on the second backup file to exclude the second backup file from being automatically retention locked after the cooling off period has elapsed; setting the second flag on the second backup file indicating that writes to the second backup file are in progress; after an interruption of the writes to the second backup file and after the cooling off period has elapsed, scanning a backup storage system on which the second backup file was stored; identifying the second backup file as being abandoned based on the second flag having been set; and deleting the second backup file, wherein the deletion of the second backup file is allowed because the first flag set on the second backup file was cleared and not reset, the second backup file thereby not having been automatically retention locked despite the cooling off period having elapsed.

The method may include after the setting a second flag, receiving, from the client-side deduplication library, data segments to be written to the backup file, the data segments corresponding to fingerprints that a deduplication server has determined to not match with fingerprints of data segments already stored by the deduplication server.

The method may include setting the first flag on a second backup file indicating that the second backup file should be automatically retention locked after the cooling off period has elapsed; after the cooling period has elapsed, automatically retention locking the second backup file; receiving a command requesting that the second backup file be opened for writes; and failing the command to open the second backup file because the second backup file has been retention locked.

The method may include after the setting a second flag, receiving, from the client-side deduplication library, a list of fingerprints corresponding to data segments that are to be backed up; filtering the fingerprints against an index of fingerprints corresponding to data segments already backed up; based on the filtering, identifying fingerprints corresponding to data segments that have yet to be backed up, and fingerprints corresponding to data segments that have already been backed up; sending the fingerprints corresponding to the data segments that have yet to be backed up to the client-side deduplication library; and receiving, from the client-side deduplication library, the data segments that have yet to be backed up.

The method may include after the clearing the second flag and resetting the first flag, determining that the cooling off period has elapsed; upon the cooling off period having elapsed, automatically retention locking the backup file.

In another embodiment, there is a system comprising: a processor; and memory configured to store one or more sequences of instructions which, when executed by the processor, cause the processor to carry out the steps of: receiving a command, issued by a client-side deduplication library, requesting creation of a backup file; upon creating the backup file, setting a first flag on the backup file indicating that the backup file should be automatically retention locked after a cooling off period has elapsed; during the cooling off period, receiving a command, issued by the client-side deduplication library, requesting that the backup file be opened for writes; clearing the first flag to exclude the backup file from being automatically retention locked after the cooling off period has elapsed; setting a second flag on the backup file indicating that writes to the backup file are in progress; receiving a command, issued by the client-side deduplication library, requesting that the backup file be closed, the writes to the backup file thereby being complete; clearing the second flag; and resetting the first flag to allow the backup file to be automatically retention locked after the cooling off period has elapsed.

In another embodiment, there is a computer program product, comprising a non-transitory computer-readable medium having a computer-readable program code embodied therein, the computer-readable program code adapted to be executed by one or more processors to implement a method comprising: receiving a command, issued by a client-side deduplication library, requesting creation of a backup file; upon creating the backup file, setting a first flag on the backup file indicating that the backup file should be automatically retention locked after a cooling period has elapsed; during the cooling period, receiving a command, issued by the client-side deduplication library, requesting that the backup file be opened for writes; clearing the first flag to exclude the backup file from being automatically retention locked after the cooling period has elapsed; setting a second flag on the backup file indicating that writes to the backup file are in progress; receiving a command, issued by the client-side deduplication library, requesting that the backup file be closed, the writes to the backup file thereby being complete; clearing the second flag; and resetting the first flag to allow the backup file to be automatically retention locked after the cooling period has elapsed.

Figure 8:
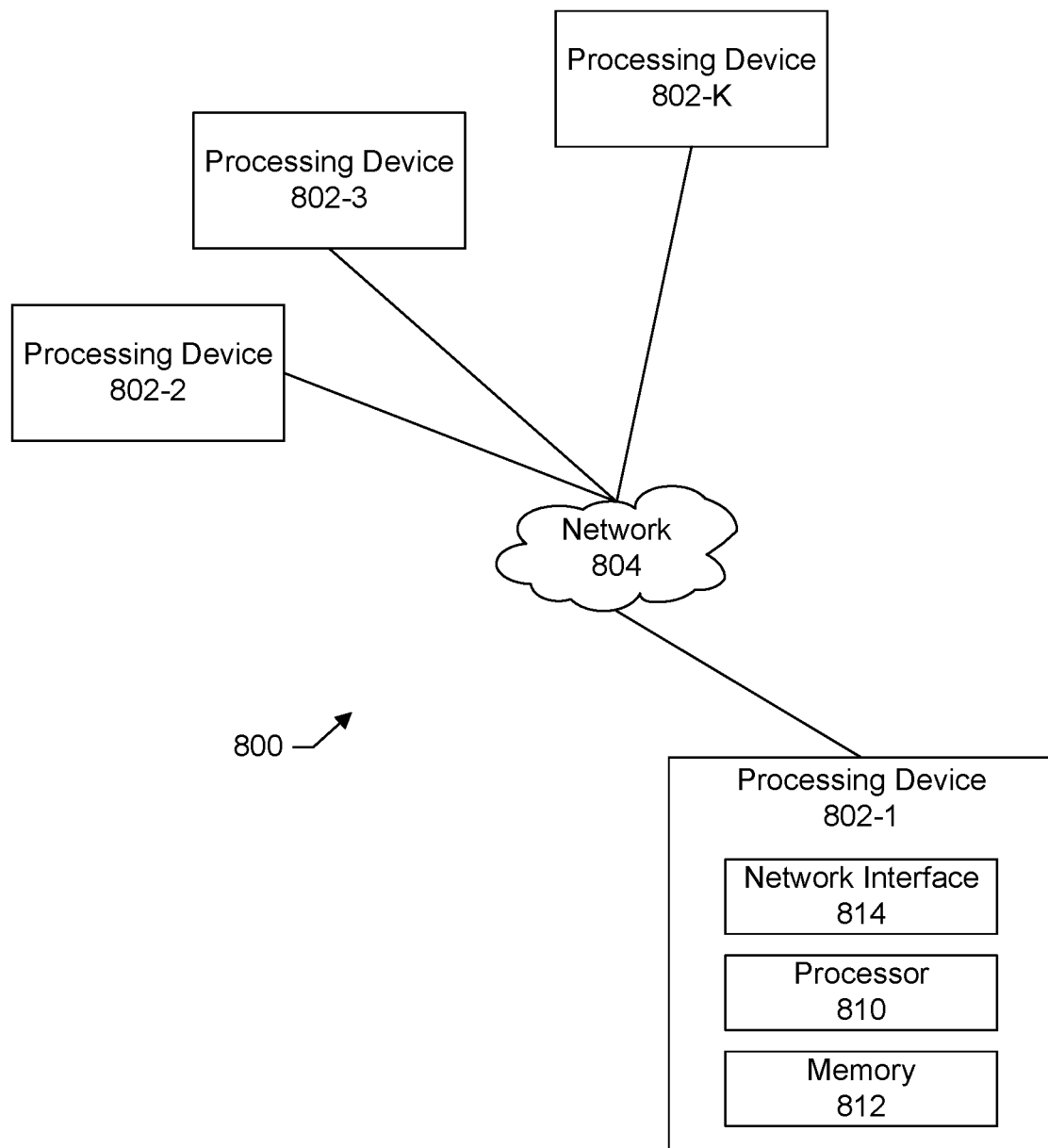
FIG. 8 shows a block diagram of a processing platform that may be utilized to implement at least a portion of an information processing system, according to one or more embodiments.

FIG. 8 shows an example of a processing platform 800 that may include at least a portion of the information handling system shown in FIG. 1. The example shown in FIG. 8 includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 9:
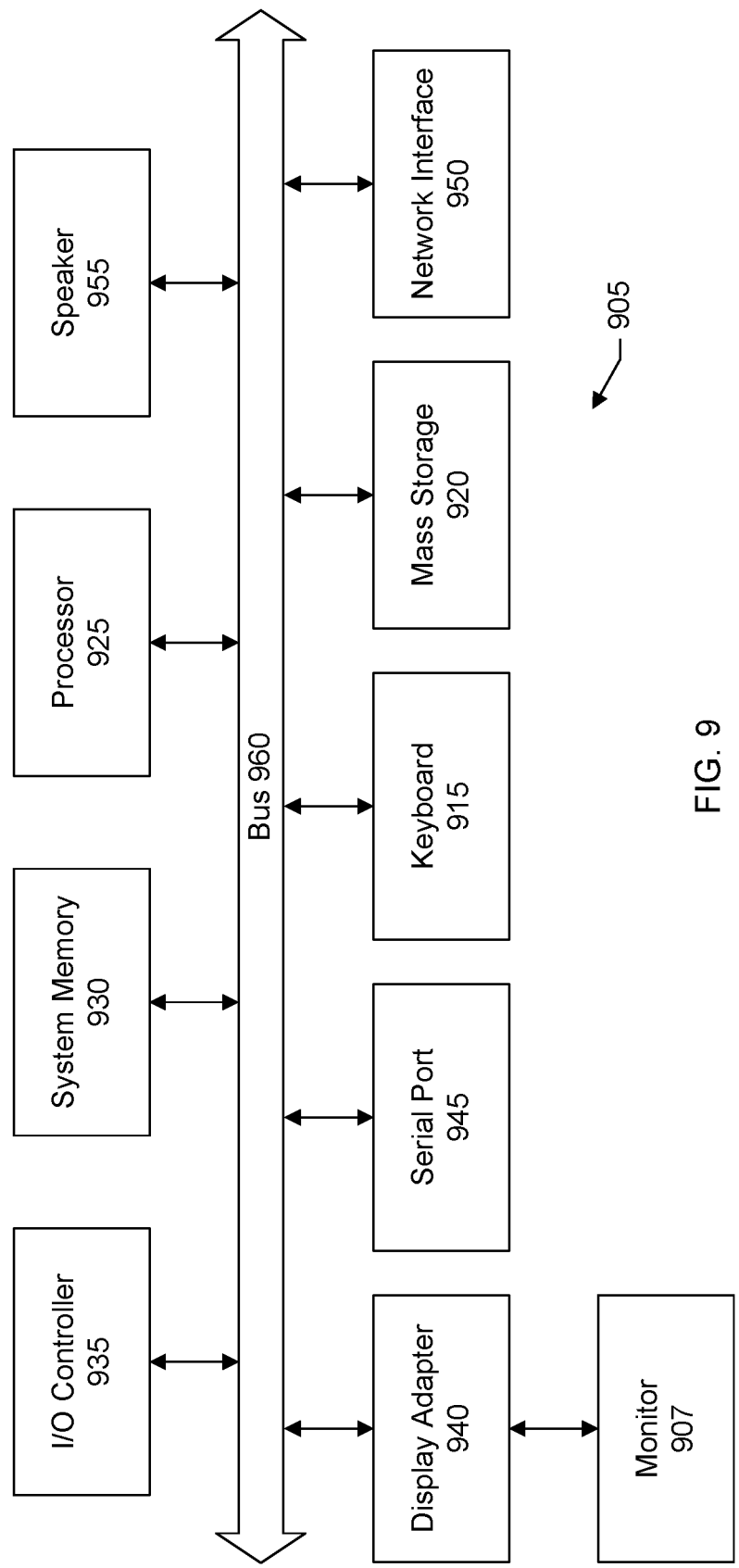
FIG. 9 shows a block diagram of a computer system suitable for use with the system, according to one or more embodiments.

FIG. 9 shows a system block diagram of a computer system 905 used to execute the software of the present system described herein. The computer system includes a monitor 907, keyboard 915, and mass storage devices 920. Computer system 905 further includes subsystems such as central processor 925, system memory 930, input/output (I/O) controller 935, display adapter 940, serial or universal serial bus (USB) port 945, network interface 950, and speaker 955. The system may also be used with computer systems with additional or fewer subsystems. For example, a computer system could include more than one processor 925 (i.e., a multiprocessor system) or a system may include a cache memory.

Arrows such as 960 represent the system bus architecture of computer system 905. However, these arrows are illustrative of any interconnection scheme serving to link the subsystems. For example, speaker 955 could be connected to the other subsystems through a port or have an internal direct connection to central processor 925. The processor may include multiple processors or a multicore processor, which may permit parallel processing of information. Computer system 905 shown in FIG. 9 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®, family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
setting, on a backup file to which data to be backed up is written, a first flag indicating that the backup file should be automatically retention locked after a cooling off period is over;
receiving, before the cooling off period is over, a request to open the backup file for writes;
allowing the open request; and
upon allowing the open request, clearing the first flag and setting a second flag on the backup file indicating that writes are in progress, the clearing of the first flag thereby excluding the backup file from being automatically retention locked after the cooling off period is over.

2. The method of claim 1 further comprising:
while the backup file is open, receiving the data from a backup client and writing the data to the backup file;
after an interruption of the writes and the cooling off period is over, scanning a backup storage system at which the backup file resides for backup files that are broken;
based on the backup file having the second flag set, identifying the backup file as being a broken backup file; and
deleting the broken backup file.

3. The method of claim 1 further comprising:
receiving a request to close the backup file;
closing the backup file; and
upon closing the backup file, clearing the second flag and resetting the first flag to allow the backup file to be automatically retention locked after the cooling off period is over.

4. The method of claim 1 further comprising:
deduplicating the data to be backed up.

5. The method of claim 1 further comprising:
writing to the backup file to conduct a backup of a client, wherein a time to complete the backup is greater than a duration of the cooling off period.

6. The method of claim 1 further comprising:
closing the backup file, wherein the closing of the backup file is accompanied by a clearing of the second flag and a resetting of the of the first flag to allow the backup file to be automatically retention locked after the cooling off period is over;
after the cooling off period is over, automatically retention locking the backup file;
receiving, during a retention duration of the backup file, a request to delete the backup file; and
failing the request to delete the backup file.

7. A system comprising: a processor; and memory configured to store one or more sequences of instructions which, when executed by the processor, cause the processor to carry out the steps of:
setting, on a backup file to which data to be backed up is written, a first flag indicating that the backup file should be automatically retention locked after a cooling off period is over;
receiving, before the cooling off period is over, a request to open the backup file for writes;
allowing the open request; and
upon allowing the open request, clearing the first flag and setting a second flag on the backup file indicating that writes are in progress, the clearing of the first flag thereby excluding the backup file from being automatically retention locked after the cooling off period is over.

8. The system of claim 7 wherein the processor further carries out the steps of:
while the backup file is open, receiving the data from a backup client and writing the data to the backup file;
after an interruption of the writes and the cooling off period is over, scanning a backup storage system at which the backup file resides for backup files that are broken;
based on the backup file having the second flag set, identifying the backup file as being a broken backup file; and
deleting the broken backup file.

9. The system of claim 7 wherein the processor further carries out the steps of:
receiving a request to close the backup file;
closing the backup file; and
upon closing the backup file, clearing the second flag and resetting the first flag to allow the backup file to be automatically retention locked after the cooling off period is over.

10. The system of claim 7 wherein the processor further carries out the steps of:
deduplicating the data to be backed up.

11. The system of claim 7 wherein the processor further carries out the steps of:
writing to the backup file to conduct a backup of a client, wherein a time to complete the backup is greater than a duration of the cooling off period.

12. The system of claim 7 wherein the processor further carries out the steps of:
closing the backup file, wherein the closing of the backup file is accompanied by a clearing of the second flag and a resetting of the of the first flag to allow the backup file to be automatically retention locked after the cooling off period is over;
after the cooling off period is over, automatically retention locking the backup file;
receiving, during a retention duration of the backup file, a request to delete the backup file; and
failing the request to delete the backup file.

13. A computer program product, comprising a non-transitory computer-readable medium having a computer-readable program code embodied therein, the computer-readable program code adapted to be executed by one or more processors to implement a method comprising:
setting, on a backup file to which data to be backed up is written, a first flag indicating that the backup file should be automatically retention locked after a cooling off period is over;
receiving, before the cooling off period is over, a request to open the backup file for writes;
allowing the open request; and
upon allowing the open request, clearing the first flag and setting a second flag on the backup file indicating that writes are in progress, the clearing of the first flag thereby excluding the backup file from being automatically retention locked after the cooling off period is over.

14. The computer program product of claim 13 wherein the method further comprises:
while the backup file is open, receiving the data from a backup client and writing the data to the backup file;
after an interruption of the writes and the cooling off period is over, scanning a backup storage system at which the backup file resides for backup files that are broken;

based on the backup file having the second flag set, identifying the backup file as being a broken backup file; and deleting the broken backup file.

15. The computer program product of claim 13 wherein the method further comprises:

receiving a request to close the backup file;

closing the backup file; and upon closing the backup file, clearing the second flag and resetting the first flag to allow the backup file to be automatically retention locked after the cooling off period is over.

16. The computer program product of claim 13 wherein the method further comprises:

deduplicating the data to be backed up.

17. The computer program product of claim 13 wherein the method further comprises:

writing to the backup file to conduct a backup of a client, wherein a time to complete the backup is greater than a duration of the cooling off period.

18. The computer program product of claim 13 wherein the method further comprises:

closing the backup file, wherein the closing of the backup file is accompanied by a clearing of the second flag and a resetting of the of the first flag to allow the backup file to be automatically retention locked after the cooling off period is over;

after the cooling off period is over, automatically retention locking the backup file;

receiving, during a retention duration of the backup file, a request to delete the backup file; and failing the request to delete the backup file.

* * * * *